Patented June 13, 1944

2,351,085

UNITED STATES PATENT OFFICE 2,351,085

PROCESS OF PRODUCING ALKALI METAL PHENYL MALONIC ESTERS

Vernon H. Wallingford, Ferguson, and August H. Homeyer, St. Louis, Mo., assignors to Mallinckrodt Chemical Works, St. Louis, Mo., a corporation of Missouri No Drawing. Application July 28, 1939, Serial No. 287,000

18 Claims. (Cl. 260—475)

This invention relates to the metallation of organic compounds, and with regard to certain more specific features, to the replacement of active carbon-bonded hydrogen atoms of a wide variety of organic compounds with metals of the class of the alkali metals.

Among the several objects of the invention may be noted the provision of a general process for bringing about a metallation of the type indicated which is characterized in its high yields, its inexpensive and readily procurable reaction materials, and the facility with which it may be carried out. Other objects will be in part obvious and in part pointed out hereinafter.

The invention accordingly comprises the steps and sequence of steps, and features of synthesis, analysis, or metathesis, which will be exemplified in the processes hereinafter described, and the scope of the application of which will be indicated in the following claims.

Metalorganic compounds of the alkali metal type are exceedingly useful intermediates for the preparation of a wide variety of organic compounds. Many processes have been devised for the preparation of such compounds, but these prior processes have usually offered one or another disadvantage, such as low yields, expensive or unavailable reaction materials, difficult reaction conditions, and the like. The present invention provides a metallation process which, so far as we can determine, is free of all such disadvantages and which consequently is a highly advantageous procedure to use to achieve the desired results.

It is difficult to define with accuracy the broad class of materials to which the process of the present invention applies. In general, it appears that the process can be satisfactorily used in all instances where metallation of the type indicated is wanted. Most of such instances seem to comprehend the replacement of an active carbon-bonded hydrogen on the organic compound with the metal, and the invention will be so described, although it is not intended thereby to so limit the scope of the invention.

From the practical standpoint, metallation of the type herein concerned is usually the formation of the sodium (sodio-) compound. But it will likewise be clearly understood that metallation with the other alkali metals is not only feasible but also expeditious according to the present invention.

Broadly speaking, the process of the present invention comprises treating the compound to be metallated with a metal alcoholate, preferably alcohol-free, in a reaction medium comprising a dialkyl carbonate. This may be represented by the following equation:

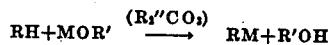

$$RH + MOR' \xrightarrow{(R_2''CO_3)} RM + R'OH$$

where R is the residue of the compound to be metallated (the H being bonded to a carbon atom of R), M is an alkali metal, R' is the radical of the alcoholate, and R'' is an alkyl.

Whether or not the dialkyl carbonate actually enters into the reaction has not yet been definitely established. Its presence appears to be an important factor.

The reaction may be forced to substantial completion by heating, as it progresses, to distill off the product alcohol (R'OH in the above equation). In case the original metal alcoholate contains alcohol, such alcohol is likewise removed by this distillation procedure. This procedure, while somewhat optional, is highly advantageous in its improvement of the yield of metallo-compound obtained.

The process of the present invention finds particular utility, for example, in the preparation of sodio-phenylmalonic ester, $C_6H_5CNa(COOC_2H_5)_2$, which is an intermediate for the preparation of phenylethylmalonic ester, which is in turn convertible into phenobarbital (phenylethyl barbituric acid). For this particular application of the invention, phenylmalonic ester is reacted with alcohol-free sodium methylate in ethyl carbonate according to the equation:

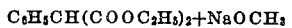

$C_6H_5CH(COOC_2H_5)_2 + NaOCH_3$

$$\xrightarrow{(C_2H_5)_2CO_3} C_6H_5CNa(COOC_2H_5) + CH_3OH$$

Details of this process, by way of example of the invention, are appended.

450 ml. of diethyl carbonate is placed in a one liter, three-necked flask, a mechanical stirrer being provided in one of the necks. 43 grams of solid anhydrous sodium methylate is then added to the diethyl carbonate, and then 177 g. of the diethyl ester of phenylmalonic acid, and the contents of the flask are stirred until the sodium methylate appears to go into solution. The flask is then attached to a fractionating column arranged for reduced pressure distillation, and placed in an oil bath. The oil bath is heated to 90–100° C. and by maintaining the pressure at about 250 mm., a mixture of alcohol and ethyl carbonate distills off. After about two hours, a total of about 65 ml. of distillate will have been collected, and the vapor temperatures, at the top and bottom of the columns will be of the order of 86° C. and 89° C., respectively, indicating that all of the alcohol has been fractionated out of the reaction mixture. The residue in the flask consists principally of the desired sodio compound, with an excess of diethyl carbonate.

Since the intended use for this sodio compound is the preparation therefrom of phenylethyl malonic ester the said sodio compound need not be recovered from the residue as such, but the residue may be worked up in the following manner:

After cooling, 100 grams of ethyl bromide is added to the entire lot of residue, and the mixture is then heated to 90° C. for three hours. After cooling, an excess of glacial acetic acid is added and the product poured on ice. The water layer is then separated and extracted with a little ether, which is combined with the organic layer. The latter is washed with water and dried over calcium chloride and then distilled at reduced pressure from a Claisen flask, yielding 405 grams of ethyl carbonate, and 179.3 grams of phenylethyl malonic ester boiling at from 125° C. at 9 mm. pressure to 147° C. at 4 mm. pressure. Assuming this product to be pure phenylethyl malonic ester, the yield (from the original phenylmalonic ester) is about 90% of the theoretical. The identity and purity of the product phenylethyl malonic ester is established by condensing a sample of it with urea, giving a high yield of phenobarbital melting at 175 to 176° C. The yield of phenobarbital is as good as is usually obtained from pure phenylethyl malonic ester made by other methods.

Carrying out the above metallation procedure without the simultaneous removal, by distillation, of the alcohol produced in the reaction, is entirely feasible, but the yield is decreased from approximately 90% to approximately 81%.

Attention is directed to our copending application, Serial No. 383,164, filed March 13, 1941.

In view of the above, it will be seen that the several objects of the invention are achieved and other advantageous results attained.

As many changes could be made in the above processes without departing from the scope of the invention, it is intended that all matter contained in the above description shall be interpreted as illustrative and not in a limiting sense.

We claim:
1. The process of making sodio-phenylmalonic esters which comprises reacting a phenylmalonic ester with a sodium alcoholate in the presence of a dialkyl carbonate.
2. The process of making sodio-phenylmalonic esters which comprises reacting a phenylmalonic ester with a sodium alcoholate in a reaction medium comprising a dialkyl carbonate.
3. The process of making sodio-phenylmalonic esters which comprises reacting a phenylmalonic ester with a sodium alcoholate in a reaction medium of diethyl carbonate.
4. The process of making sodio-phenylmalonic esters which comprises reacting a phenylmalonic ester with a sodium alcoholate in a reaction medium of a dialkyl carbonate, and continuously removing alcohols from the reaction mixture.
5. The process as set forth in claim 1, in which the alcoholate is substantially alcohol-free sodium methylate.
6. The process as set forth in claim 3, in which the alcoholate is substantially alcohol-free sodium methylate.
7. The process as set forth in claim 4, in which the alcoholate is substantially alcohol-free sodium methylate.
8. The process of making alkali metal metallophenylmalonic esters which comprises reacting a phenylmalonic ester with an alkali metal alcoholate in the presence of a dialkyl carbonate.
9. The process of making alkali metal metallophenylmalonic esters which comprises reacting a phenylmalonic ester with an alkali metal alcoholate in a reaction medium comprising a dialkyl carbonate.
10. The process of making alkali metal metallophenylmalonic esters which comprises reacting a phenylmalonic ester with an alkali metal alcoholate in a reaction medium of dialkyl carbonate.
11. The process of making alkali metal metallophenylmalonic esters which comprises reacting a phenylmalonic ester with an alkali metal alcoholate in a reaction medium of diethyl carbonate.
12. The process of making alkali metal metallophenylmalonic esters which comprises reacting a phenylmalonic ester with an alkali metal alcoholate in a reaction medium of a dialkyl carbonate, and continuously removing alcohols from the reaction mixture.
13. The process of making alkali-metal metallophenylmalonic esters which comprises reacting a phenylmalonic ester with a substantially alcohol-free alkali metal alcoholate in the presence of a dialkyl carbonate.
14. The process of making alkali metal metallophenylmalonic esters which comprises reacting a phenylmalonic ester with a substantially alcohol-free alkali metal alcoholate in a reaction medium of dialkyl carbonate.
15. The process of making alkali metal metallophenylmalonic esters which comprises reacting a phenylmalonic ester with a substantially alcohol-free alkali metal alcoholate in a reaction medium of a dialkyl carbonate, and continuously removing alcohols from the reaction mixture.
16. The process of making alkali metal metallophenylmalonic esters which comprises reacting a phenylmalonic ester with an alkali metal alcoholate in the presence of diethyl carbonate.
17. The process of making alkali metal metallophenylmalonic esters which comprises reacting a phenylmalonic ester with an alkali metal alcoholate in a reaction medium comprising diethyl carbonate.
18. The process of making alkali metal metallophenylmalonic esters which comprises reacting a phenylmalonic ester with an alkali metal alcoholate in a reaction medium of diethyl carbonate, and continuously removing alcohols from the reacting mixture.

VERNON H. WALLINGFORD.
AUGUST H. HOMEYER.